United States Patent Office 3,244,596
Patented Apr. 5, 1966

3,244,596
COATED MEDICINAL AGENTS AND COATING
COMPOSITIONS THEREFOR
John Louis Lach, % University of Iowa College of
Pharmacy, Iowa City, Iowa
No Drawing. Filed Oct. 18, 1962, Ser. No. 231,542
19 Claims. (Cl. 167—82)

This invention relates generally to a coating composition for tablets and other dosage forms of medicinal agents.

More particularly, the invention relates to coating compositions which, through slight variations in composition, are utilizable as so-called "film" or protective coatings for medicinal agents and enteric coatings for medicinal agents.

The invention also relates to tablets and other dosage forms of medicinal agents coated with the instant composition.

Dosage forms are coated for one or more reasons. Some types of coatings protect the ingredients against the atmosphere. Oxygen or carbon dioxide of the atmosphere may react chemically with the drug in the presence of moisture, or the medicinal substance may absorb moisture and hydrate; or the drug may react chemically with the water vapor of the air. Examples are some inorganic salts, some vitamins, and powdered extracts.

Coatings may be used to mask unpleasant taste and odor. For example, belladonna, quinine salts, aconite, and salts of substituted barbituric acids all have bitter tastes, while asafetida, valerian, and some sulfur-containing drugs have both an unpleasant taste and odor.

Almost all coatings serve the additional purpose of improving the appearance of uncoated tablets and pills. For some reason, people object less to taking a polished, brightly-colored, coated tablet or pill than an uncoated one. Moreover, polishing of the tablets and pills makes them easier to swallow.

One specialized purpose of coatings is to control the site of action of the medicament. Some drugs, e.g. hexylresorcinol, are caustic and must not be permitted to contact oral mucosa. Enteric coating renders the dosage form insoluble in the stomach and soluble in the intestines. There are many reasons for the enteric coating of medicaments.

The two main areas in which dosage forms or units of medicaments are coated fall mainly into film coatings and enteric coatings. Because of the difference in purpose, the two types of coatings require divergent properties. Compositions which are used preferably as film coatings and the like are generally not adaptable as enteric coatings, and vice versa.

Originally, sugar coatings were used in instances where film coatings are now used, but many difficulties were encountered: for example, uneven thickness occurred due to faulty sub-coating, which in turn may be caused by adding the dusting powder before the tablets have become tacky, or by using too little or too much powder or syrup; failure to screen the tablets after the sub-coating caused small particles to adhere to the tablets; or spotted coating resulted from moisture working out, which in turn is due to the tablets not being dry before each application of the syrup is made.

Improvements in the protective coating areas have been made with the advent of film coatings. In the mid 1950s, sugar coatings were commonly replaced by film coatings such as by applications of hydroxy ethyl cellulose or sodium carboxyl methyl cellulose over a shellac sealed dosage unit, by zein, by solutions of polyvinyl pyrrolidine, polyethylene glycol, and acetalated monoglyceride, and by solutions of cellulose acetate phthalate and polyethylene glycol, with or without plasticizers and/or other excipients.

These film coatings have many advantages over the sugar coating. However, many of the film coating compositions require the formation of multiple coats (as many as 20 coats) to effectively coat the medicament. Additionally, many of these compositions are also difficultly colorable. Moreover, few, if any, of these film coating compositions are easily adaptable as enteric coating compositions.

Enteric coatings are those coatings which would not be affected by gastric secretions for the time a tablet might be expected to remain in the stomach but should dissolve or disintegrate promptly on passing from the stomach into the duodenum. Compositions which have been partially successful as enteric coatings include keratin, salol, cellulose derivatives, fats and fatty acids, waxes and natural resinous substances. While most of these materials meet the pH requirements of an enteric coating, they are not entirely satisfactory because of coating problems, stability problems, physiological effects and incompatibility with certain medicines. The cellulose acetate phthalates which are commonly employed in the preparation of many of the enteric coatings are not easily colored, and usually require a two-step procedure.

The tablet is usually colored prior to the coating with the cellulose acetate phthalate composition. Moreover, usually numerous coats of the cellulosic enteric coating compositions are applied, requiring much time to effect drying between each coat, resulting in a lengthy procedure.

It has now been discovered that coatings which can effectively be used for all of the above-mentioned purposes can be made from compositions comprising a dimer of an unsaturated, aliphatic, monocarboxylic acid having from 16 to 26 carbon atoms. The coating is effected by merely dissolving the dimer acid in a suitable solvent and tailoring the composition for each use by controlling the concentration of the solution, with or without the addition of well known plasticizers and/or other excipients.

The coating composition is then applied as a single coat, requiring no heat or dusting in the procedure. When the compositions are to be used for any of the aforementioned purposes, there are neither problems with coloring nor with application. Moreover, the application of the instant composition as an enteric coating requires very little more time than its application as a film coating.

By adding certain plasticizers and/or other excipients to the coating composition of the instant invention, various effects are obtained. For example, glycerol esters of long chain fatty acids which have been commonly used as plasticizers, when added to the dimer acids, form compositions which are particularly adaptable as enteric coatings. While castor oil is preferred for use as the glycerol ester, other esters such as those found in mineral oil, corn oil, sesame oil, and the like may be used.

The supposed structure of the dimer acids which may be used in preparing the compositions of the instant invention may be represented by the following structural formula:

(I)
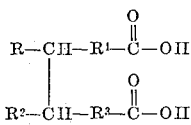

Where R, $R^1$, $R^2$ and $R^3$ represent at least one member of the group consisting of aliphatic carbon chains having from 1 to 25 carbon atoms.

The dimer acids which are particularly preferred for the instant invention are dimers of oleic acid, which may include minor amounts of linoleic or linolenic acid and the like. The presence of up to 10% by weight of monomers and trimers of the said acid is tolerable, but it is preferred that not more than 5% of the monomers and trimers be present. The trimer is usually present in greater amounts than the monomer.

The dimer acids employed with the instant invention are conveniently prepared by the method outlined in U.S. Patent No. 2,793,219.

The aliphatic, monohydroxy alcohols, preferably those having from about 1 to 5 carbon atoms, are particularly useful as solvents for the above dimers. However, solutions can be made in other organic solvents which possess sufficient solvent action upon the constituents and do not undergo undesirable reactions with either the constituents of the coating or the material to be coated. Suitable for this purpose are, in addition to the lower alcohols, lower ketones, lower dialkyl ethers, and lower alkyl esters.

The enteric coatings preferably comprise from about 10 parts by weight to about 20 parts by weight of at least one of the said dimer acids, and from about 5 parts by weight to about 15 parts by weight of a glycerol ester of the fatty acid.

Other excipients which may be used in preparing the compositions of the present invention include hardening agents such as polyethylene glycol (PEG 4000) glyceryl monostearate and other stearic acid esters and the like; fillers such as talc, metal soaps, carbon, kaolin, waxes, and the like; and plasticizers other than the above-mentioned glycerol esters such as mono and dialkyl phthalates, propylene glycol, and the like; and surface active agents such as polyoxyethylene sorbitan derivatives and the saturated fatty alcohols of the Duponol type.

Among the coloring agents which may be used in the practice of this invention are any of the non-toxic dyes, lakes, and pigments which have been certified for use in the food, drug, and cosmetic industries. For example, dyes of the type represented by red D. and C. No. 37, green F.D. and S. No. 1, yellow D. and C. No. 11, red D. and C. No. 21, orange D. and C. No. 4, red D. and C. No. 18, and red D. and C. No. 39 are suitable for use as colorants in the coating composition. Among the pigments which are suitable are yellow hydrated iron oxide, brown hydrated iron oxide, red iron oxide, black iron oxide, titanium dioxide, and the ultramarine blues. Many lakes are found suitable in the practice of this invention, and D. and C. red No. 3, D. and C. orange No. 17, D. and C. green No. 1, D. and C. red No. 1, D. and C. yellow No. 1 are representative of the class. A lake is a dye which has been precipitated on an insoluble metal compound. In the case of D. and C. dyes, which means those suitable for use in the drug and cosmetic industry, it is necessary to deposit the dye on a pharmaceutically acceptable carrier such as aluminum hydroxide.

In applying the coating compositions of the instant intion to the surface of the tablet or other dosage form of a medicament, the dimer acid, with or without other constituents, such as plasticizers, colorants, or other excipients, is put into solution and/or suspension in amounts sufficient to provide a solution viscosity suitable for the application of the particular coating composition to the particular dosage form to be coated. Viscosities in the $Z+(Z-Z_5$, Gardner-Holdt) range are generally preferred.

The coating procedure may be the conventional one using a rotating pan and means for applying a stream of air. The tablets are placed in the pan, and the pan is rotated during application of the coating material in a thin stream. The finish coat, or gloss, is effected by adding a material such as magnesium stearate or talc and rotating the pan until the desired gloss is acquired. The overall time of coating is less than 2 hours, depending on the desired thickness of the coat. Where colorants are used, they are directly incorporated into the coating composition prior to application to the tablet or dosage unit.

The terms "weight by volume," "weight per volume" and "w./v." are used herein for their customary meaning as understood in the pharmaceutical industry. All three expressions mean the same thing, that is, the weight of ingredients per unit volume of suspension or solution. The expression is used for convenience in designating the amount of a solid that is to be dissolved or suspended in a liquid to give a definite ultimate volume of solution or suspension. In other words, 10% weight per volume means, for example, 10 grams of solid dissolved or suspended in a liquid and the liquid made up to a total volume of 100 ml.

The following examples are given by way of illustration and not by way of limitation.

*Example I*

15 percent by weight per volume of the Empol 1014 (95% dimer, 4% trimer, and 1% monomer of oleic acid) in isopropanol was mixed to form a true solution. Approximately 1000 tablets containing mainly sugar (⁵⁄₁₆" deep concave) were placed in a pan, and pan was rotated for about five minutes, while using compressed air to remove any powder and fine particles in the tablets.

27 milliliters of the above solution was added on the tablets in a thin stream in diminishing increments to insure even distribution (e.g., 10–6–4–4–3 ml.). The pan was allowed to rotate for two or three minutes after the addition of each increment before blowing air onto the tablets for five more minutes. The pan was then kept rotating with the air cut off and magnesium stearate was added to the tablets until a glossy coat resulted, an additional 30 minutes of rotation being required for this purpose. Finally, a small amount of talc was added to the tablets and the pan rotated for another five minutes. The final coating provided a good, hard, tough film coating.

*Example II*

A similar solution to that of Example I was made up utilizing 15 percent weight per volume of Empol 1014 and 10 percent weight per volume of castor oil in isopropanol. This solution was mixed until homogeneous and applied to the tablets as above. The coated tablets were subjected to the standard in vitro test. The effect of the coating was as follows:

(a) Tablets are affected in 60 minutes by gastric fluid U.S.P.
(b) The same tablets, when dropped in intestinal fluid U.S.P., started disintegrating in 20 minutes.
(c) Tablets completely disintegrated in intestinal fluid U.S.P., started disintegrating in 20 minutes.

*Example III*

A similar solution to that of Example I was made up utilizing 15 percent weight per volume of Empol 1014, 10 percent weight per volume of castor oil, and 2 percent weight per volume of glyceryl monostearate in isopropanol. This solutioin was made homogeneous and applied as above to similar tablets. The coated tablets were again subjected to the same in vitro test. The effect of the coating was as follows:

(a) Tablets not affected in 60 minutes by gastric fluid U.S.P., and did not start to disintegrate until 150 minutes had elapsed.
(b) The same tablets, when dropped in intestinal fluid U.S.P., started disintegrating after 21 minutes.
(c) Tablets completely disintegrated in intestinal fluid U.S.P. in 54 minutes.

*Example IV*

A similar solution to that of Example I was made up utilizing 15 percent weight per volume of Empol 1014, 5 percent weight per volume of castor oil, 2 percent weight per volume of glyceryl monostearate, and 1 percent weight per volume of polyethylene glycol (PEG 4000) in isopropanol N.F. adjusted to 100 percent. This coating resisted gastric fluid U.S.P. for 2⅓ hours.

*Example V*

A similar solution to that of Example I was made up utilizing 15 percent weight per volume of Empol 1014, 10 percent weight per volume of castor oil, 5 percent weight per volume of glyceryl monostearate, and 1 percent weight per volume of polyethylene glycol (PEG 4000) in isopropanol, N.F., calculated to 100 percent. This coating resisted gastric fluid U.S.P. for 3¼ hours; started to disintegrate in 22 minutes in intestinal fluid U.S.P., and completely disintegrated in intestinal fluid U.S.P. in 59 minutes.

All of the samples prepared in Examples II to V pass the U.S.P. standards for enteric coatings.

*Example VI*

The following exemplifies the preparation and use of a desirable film coating composition:

A similar solution to that of Example I was made up utilizing 15 percent weight per volume of Empol 1014 and 1 percent weight per volume of polyethylene glycol (M.W. 4000) in isopropanol.

The coating procedure used was the same as that in Example I, except that the tablets were only rotated for 20 minutes, and the polishing material contained more talc and less magnesium stearate. The uncoated tablets started to disintegrate in three minutes in distilled water and were completely disintegrated in 44 minutes in distilled water. The coated tablets started to disintegrate in four minutes in distilled water, and completely disintegrated in 44.5 minutes in distilled water.

The composition of the instant invention also may be used in the preparation of capsules as containers for medicaments in dosage forms. As tablet coatings, they may be sprayed by well known procedures, or they may be utilized as compression coatings wherein they are mixed with various granulating materials and applied over a dosage form or tablet by pressure. Because of their substantial neutrality, the dimer acid coating compositions of the instant invention particularly lend themselves to the coating of chemicals and pharmaceuticals.

It is not intended that the present invention be limited by the specific illustrations thereof, and it is intended to include all of the embodiments falling within the scope of the appended claims.

What is claimed is:

1. A composition of matter particularly adaptable as an enteric coating for a dosage unit of a medicinal agent, comprising from about 10 percent weight per volume to about 20 percent weight per volume of a dimer of an unsaturated, aliphatic, monocarboxylic acid having from 16 to 26 carbon atoms, from about 5 percent weight per volume to about 15 percent weight per volume of a glycerol ester of a long chain fatty acid, and a solvent for said dimer and said ester.

2. A composition of matter particularly adaptable as an enteric coating for a dosage unit of a medicinal agent, comprising from about 10 percent weight per volume to about 20 percent weight per volume of a dimer of oleic acid, from about 5 percent weight per volume to about 15 percent weight per volume of castor oil, and a solvent for said dimer and said castor oil.

3. A composition of matter particularly adaptable as a coating for a dosage unit of a medicinal agent, comprising from about 10 parts by weight to about 20 parts by weight of a dimer of an unsaturated, aliphatic, monocarboxylic acid having from 16 to 26 carbon atoms and from about 5 parts by weight to about 15 parts by weight of the glycerol ester of a long chain fatty acid.

4. A composition of matter particularly adaptable as an enteric coating for a dosage unit of a medicinal agent, comprising from about 10 parts by weight to about 20 parts by weight of a dimer of oleic acid and from about 5 parts by weight to about 15 parts by weight of castor oil.

5. A composition of matter particularly adaptable as an enteric coating for a dosage unit of a medicinal agent, comprising from about 10 parts by weight to about 20 parts by weight of a dimer of oleic acid, from about 5 parts by weight to about 15 parts by weight of castor oil, and from about 2 parts by weight to about 5 parts by weight of glyceryl monostearate.

6. A composition of matter particularly adaptable as an enteric coating for a dosage unit of a medicinal agent, comprising from about 10 parts by weight to about 20 parts by weight of a dimer of oleic acid, from about 5 parts by weight to about 15 parts by weight of castor oil, from about 2 parts by weight to about 5 parts by weight of a glyceryl monostearate, and about 1 part by weight of a polyethylene glycol having a molecular weight of about 4000.

7. A composition of matter particularly adaptable as an enteric coating for a dosage unit of a medicinal agent, comprising about 15 parts by weight of a dimer of oleic acid, about 10 parts by weight of castor oil, about 5 parts by weight of glyceryl monostearate, and about 1 part by weight of polyethylene glycol having a molecular weight of about 4000.

8. A composition of matter particularly adaptable as a film coating for a dosage unit of a medicinal agent, comprising about 15 parts by weight of a dimer of oleic acid and one part by weight of polyethylene glycol having a molecular weight of about 4000.

9. A composition of matter particularly adaptable as a film coating for a dosage unit of a medicinal agent, comprising 15 percent weight per volume of a dimer of oleic acid, 1 percent weight per volume of polyethylene glycol having a molecular weight of 4000, and a solvent for said dimer and said polyethylene glycol.

10. A solid oral dosage unit comprising at least one medicinal agent enclosed within a coating comprising a dimer of an unsaturated, aliphatic, monocarboxylic acid having from 16 to 26 carbon atoms.

11. A solid oral dosage unit comprising at least one medicinal agent enclosed within a coating consisting essentially of a fatty acid derivative, said fatty acid derivative comprising at least 95 percent by weight of a dimer of oleic acid and up to 5 percent by weight of a mixture of monomer and trimer of the said acid.

12. A solid oral dosage unit comprising at least one medicinal agent enclosed within a coating comprising a dimer of an unsaturated, aliphatic, monocarboxylic acid having 18 carbon atoms.

13. A solid oral dosage unit comprising at least one medicinal agent enclosed within a coating comprising a dimer of oleic acid.

14. A solid oral dosage unit comprising at least one medicinal agent enclosed within a coating comprising a dimer of an unsaturated, aliphatic, monocarboxylic acid having 18 carbon atoms and a plasticizer.

15. A solid oral dosage unit comprising at least one medicinal agent enclosed within a coating comprising a dimer of an unsaturated, aliphatic, monocarboxylic acid having 18 carbon atoms, a plasticizer, and at least one hardening agent.

16. A solid oral dosage unit comprising at least one medicinal agent enclosed within a coating comprising a dimer of oleic acid, a glycerol ester of a long chain unsaturated fatty acid, and at least one hardening agent.

17. A solid oral dosage unit comprising at least one medicinal agent enclosed within a coating comprising a dimer of an oleic acid, castor oil, glyceryl monostearate, and polyethylene glycol.

18. A method of providing a coating about a solid oral dosage unit with a single coating step, said method comprising immersing said unit into a solution comprising from about ten percent weight per volume to about twenty percent weight per volume of a dimer of an unsaturated aliphatic, monocarboxylic acid having from 16 to 26 carbon atoms and a solvent for said dimer, maintaining the unit so immersed for a sufficient period of time to obtain a coating of the dimer of a predetermined thickness on the unit, and then separating the coated unit and said solvent.

19. The method of claim 18 wherein said solution further includes a glycerol ester of a long chain fatty acid in an amount to produce on said unit an enteric coating.

References Cited by the Examiner

UNITED STATES PATENTS

| | | | |
|---|---|---|---|
| 2,071,511 | 2/1937 | Eldred | 167—82 |
| 2,714,084 | 7/1955 | Hermelin | 167—82 |
| 2,731,481 | 1/1956 | Harrison et al. | 260—407 |
| 2,793,219 | 5/1957 | Barrett et al. | 260—407 |
| 2,793,220 | 5/1957 | Barrett et al. | 260—407 |
| 3,043,747 | 7/1962 | Long | 167—82 |
| 3,062,720 | 11/1962 | Costello | 167—82 |
| 3,097,144 | 7/1963 | Banker | 167—82 |

JULIAN S. LEVITT, *Primary Examiner.*

FRANK CACCIAPAGLIA, JR., *Examiner.*